Patented Oct. 25, 1932

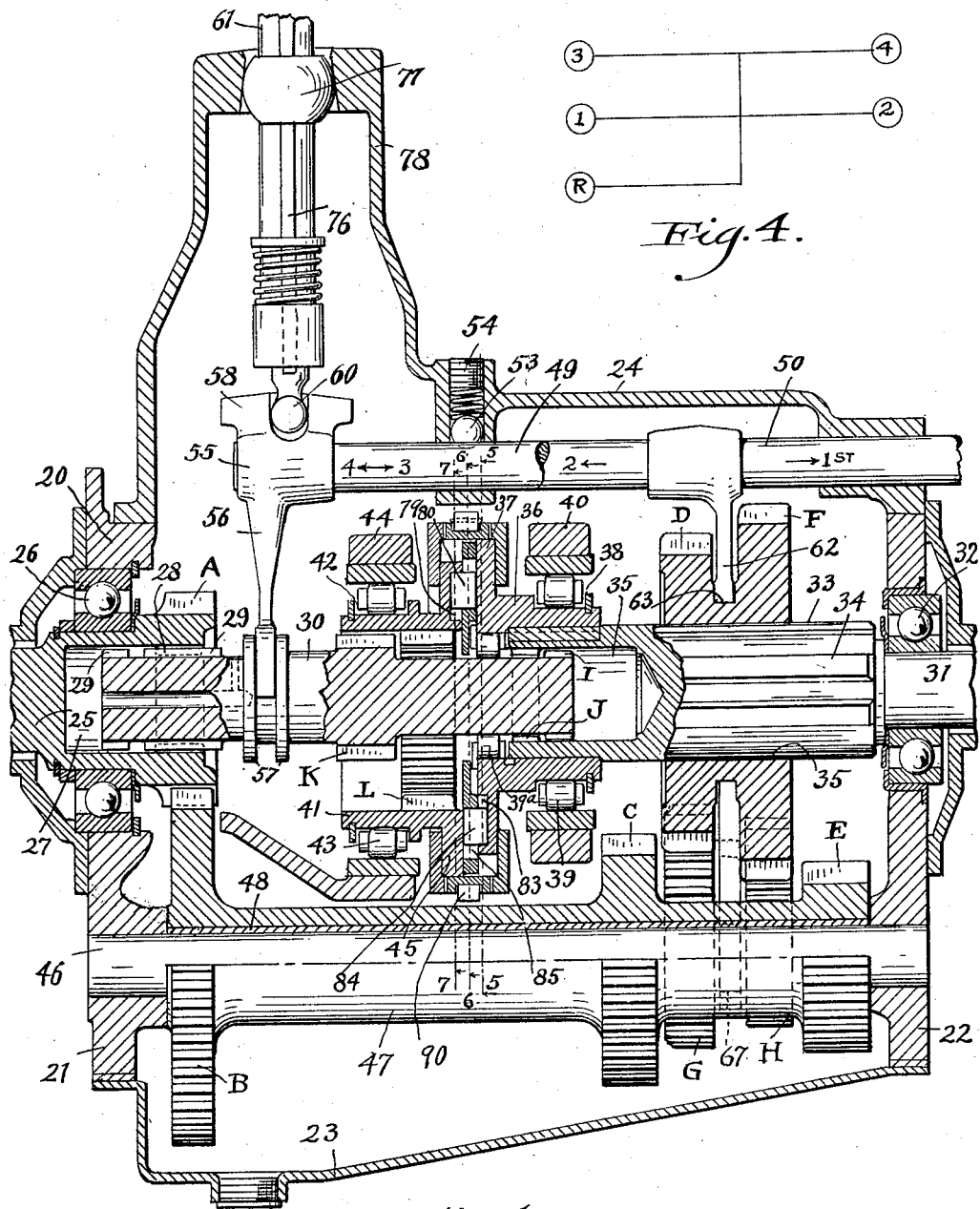

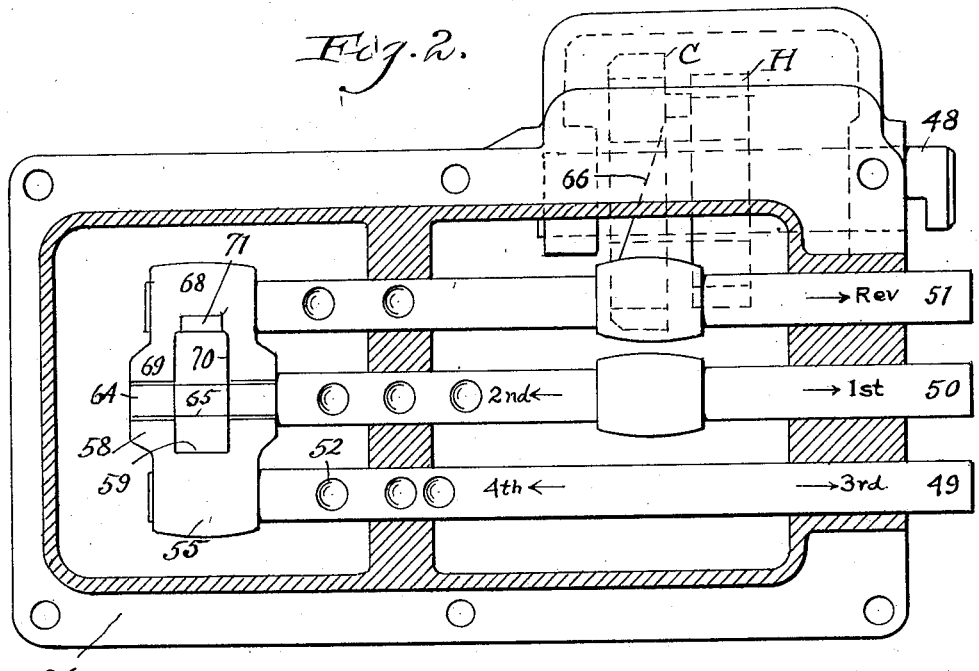
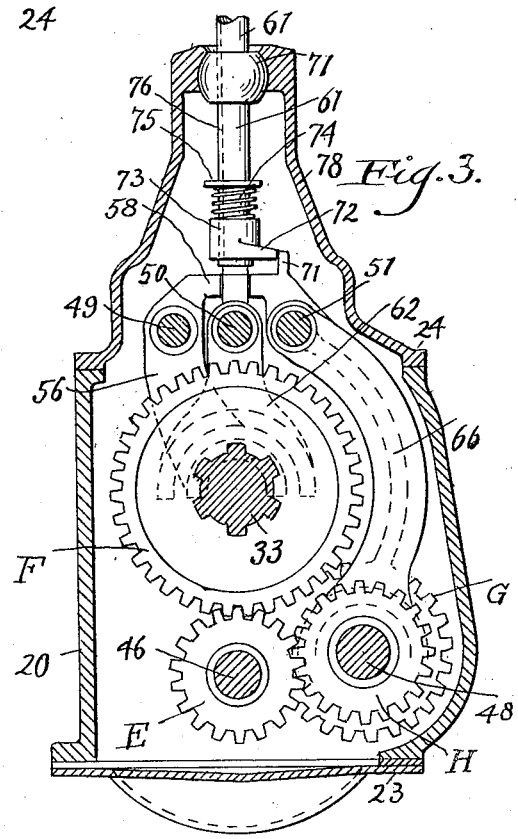
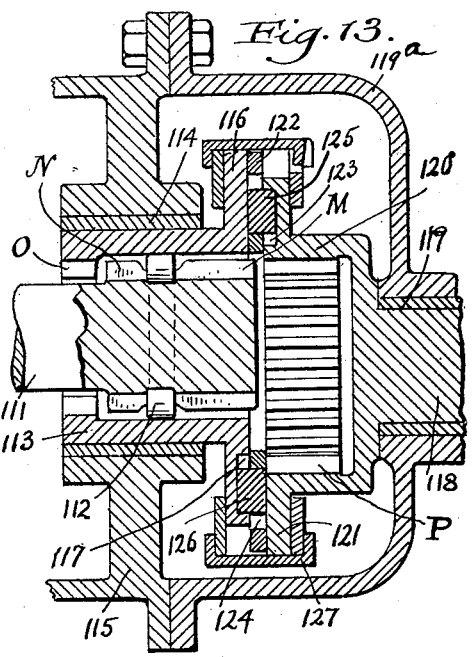

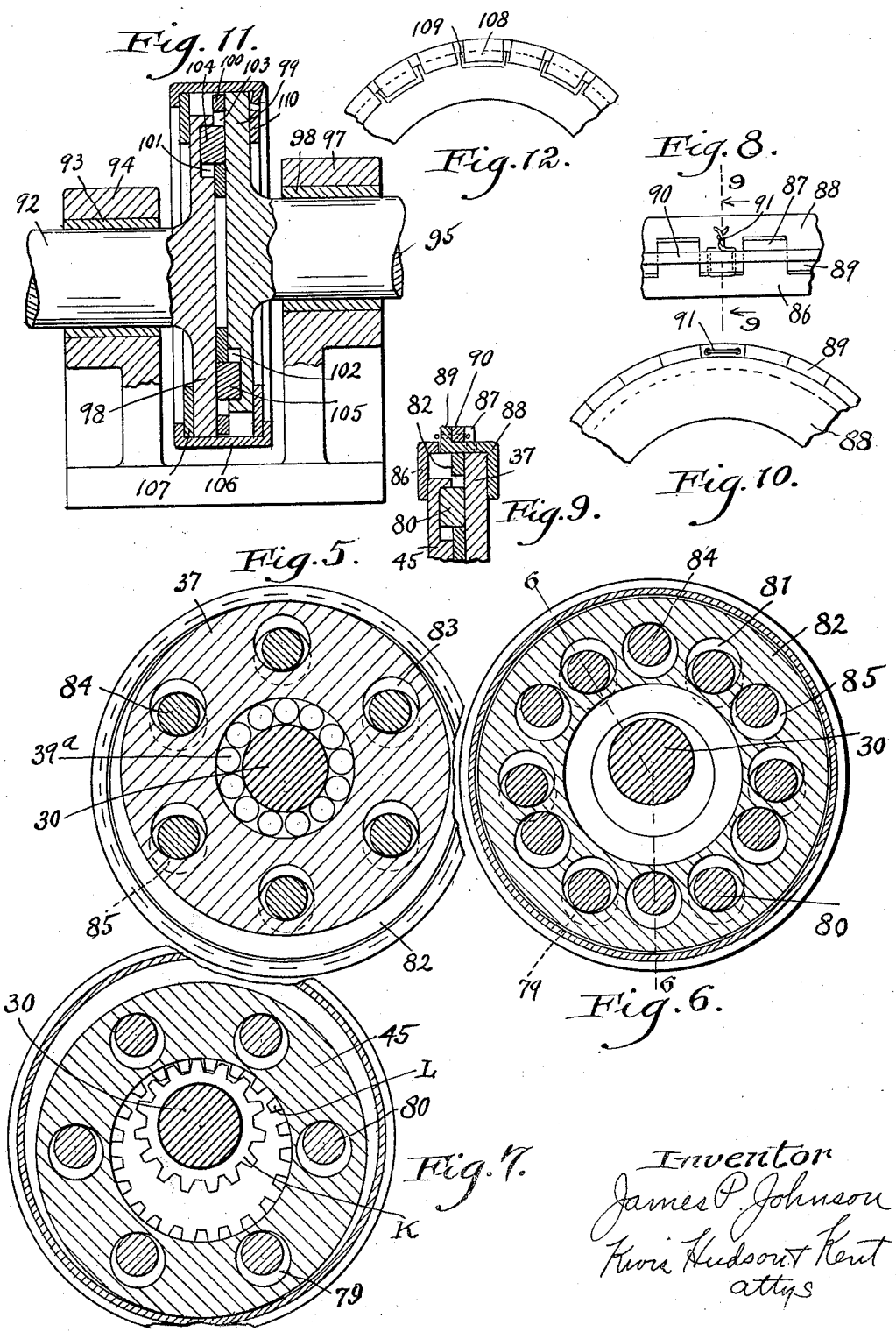

1,884,976

UNITED STATES PATENT OFFICE

JAMES P. JOHNSON, OF CLEVELAND, OHIO

COUPLING FOR TRANSMISSION GEARING

Application filed May 19, 1930. Serial No. 453,464.

This invention relates to gearing and more particularly to transmission gearing incorporating two quiet high speeds of improved construction, but it should be understood that its use is not limited in this respect as the same may be employed with various types of gear reductions for different purposes.

An object of the invention is to provide an improved gear reduction which is simple in construction, inexpensive to manufacture, and efficient in operation.

Another object of the invention is to provide an improved eccentric driving connection between aligned driving and driven members whereby larger anti-friction driving members may be employed to provide increased strength and the eccentricity reduced to a minimum to thereby reduce the over-all dimensions.

With the objects above indicated and other objects hereinafter explained in view, my invention consists in the combination and construction of elements hereinafter described and claimed.

Referring to the drawings—

Fig. 1 is a longitudinal sectional view of a transmission embodying the present invention;

Fig. 2 is a top plan view, partly in section, showing the arrangement of the shiftable rods;

Fig. 3 is an elevational sectional view showing the arrangement of the shifting forks;

Fig. 4 is a diagrammatic illustration of the shift employed with the present type of transmission embodying the present invention;

Fig. 5 is a vertical sectional view taken on line 5—5 of Fig. 1 and showing the eccentric driving connection;

Fig. 6 is a vertical sectional view taken on line 6—6 of Fig. 1 and showing the same;

Fig. 7 is a vertical sectional view taken on line 7—7 of Fig. 1 and showing the same;

Fig. 8 is a fragmentary top plan view of the enclosure members for the eccentric driving connection;

Fig. 9 is a fragmentary transverse sectional view taken on line 9—9 of Fig. 8;

Fig. 10 is a fragmentary side elevational view of that shown in Fig. 9;

Fig. 11 illustrates the adaptability of the driving connection to eccentric rotatable shafts;

Fig. 12 is a fragmentary side elevational view of a modified form of the enclosure members for the eccentric driving connection; and Fig. 13 is a modified form of the gear reduction embodied in the present invention.

In the drawings, 20 represents generally a housing of cast iron or other suitable material which has a forward end portion 21 and rear end portion 22. The lower portion of the housing 20 is cut away to provide an opening which is closed by a drip pan 23 suitably attached to the housing by any well known means. The upper portion of the housing 20 is also cut away to provide a suitable opening which is closed by a cover 24 attached to the housing by bolts or other suitable means as is customary.

A drive shaft 25 has an enlarged inner end portion which is rotatably supported by an anti-friction bearing 26 which is secured within a suitable opening extending transversely through the forward end portion 21 of the housing 20. Beyond the bearing 26 the enlarged portion of the drive shaft 25 has formed thereon an external gear A having any desired number of teeth and for a purpose which will be later described.

The inner end of the drive shaft 25 is bored axially at 27 and has provided upon its inner peripheral surface internal splines 28 which latter are adapted to cooperate with external splines 29 preferably formed integral with the forward end of a slidable driving member 30.

This slidable driving member 30, it will be noted, is free to be moved axially within the bore 27 of the drive shaft 25 but is prevented from relative independent rotation by means of the cooperating splines 28 and 29.

A driven shaft 31 is rotatably supported by an anti-friction bearing 32 which is suitably secured in the usual manner within a transverse opening provided in the rear end portion 22 of the housing 20. This driven shaft 31 has an enlarged forward end portion 33 which preferably lies within the housing and has formed on its outer surface a plurality of longitudinally extending external splines 34, for a purpose to be later described. The inner end of the enlarged portion 33 of the driven shaft 31 is bored axially at 35 and has disposed therein the rear end portion of the slidable driving member 30. An internal clutch member J is formed upon the inner forward peripheral portion of the bore 35 while an external clutch member I is formed upon the outer surface of the slidable driving member 30 and preferably at the extreme rear end thereof, so that the external clutch member I lies within the bore 35 and to the rear of the internal clutch member J, as clearly shown in Fig. 1. It will be noted, therefore, that as the slidable driving member 30 is movable longitudinally the external clutch member I may be brought into clutching engagement with the internal clutch member J with the result that the driven shaft 31 is rotated directly and at the same speed as the drive shaft 25.

The forward end of the enlarged portion 33 of the driven shaft 31 has keyed thereto a cylindrical hub portion 36 which has formed integral therewith a laterally extending flange in the form of a disk 37, for a purpose to be later described. The hub portion 36 is machined at 38 to provide a race for a plurality of anti-friction rollers 39 which latter are supported in a portion 40 of the housing 20 with the result that the forward end of the driven shaft 31 is suitably supported to maintain the driven shaft in axial alignment under load.

A cylindrical hub portion 41 is machined at 42 to provide a race for a plurality of anti-friction rollers 43 which latter are supported in a portion 44 of the housing 20. It will be noted that the hub portion 41 is mounted for rotation about an axis which is eccentric to the axis of rotation of the hub portion 36, for a purpose to be later described and, additionally, that the hub portion 41 is provided with an integral laterally extending flange 45 in the form of a disk of substantially the same diameter as the diameter of the disk 37.

These disks 37 and 45 are suitably connected by anti-friction means, in a manner which will be later described in detail, to provide positive anti-friction driving connection therebetween.

An internal gear L, having any desired number of teeth, is preferably formed integral with the hub member 41 and upon the inner peripheral portion thereof adjacent to the flange 45. This internal gear L is adapted to mesh with an external gear K formed integral with the slidable driving member 30 and is disposed normally ahead of the internal gear L. This external gear K may have any desired number of teeth depending upon the gear reduction desired and it will be readily apparent that as the slidable driving member 30 is movable longitudinally the external gear K may be brought into meshing engagement with the internal gear L to drivingly connect the drive shaft 25 with the driven shaft 31 for rotation at a reduced speed. It should be further noted that by providing the anti-friction rollers 43 rigidly supported within the portion 44 of the housing 20 adjacent the internal gear L this gear is rigidly supported under load conditions, thereby tending to eliminate noise and wear upon the movable parts.

A countershaft 46 has its ends secured, respectively, within the front end portion 21 and the rear end portion 22 of the housing 20 and preferably parallel with the axis of rotation of the drive shaft 25 and the driven shaft 31.

A hub portion 47 carries a longitudinally extending bushing 48, preferably of bronze or other suitable material, and is rotatably supported by the countershaft 46. At the forward end of the hub portion 47 there is provided, and preferably integral therewith, an external gear B having any desired number of teeth which is adapted to constantly mesh with the external gear A formed on the drive shaft 25. At the rear of the hub portion 47 there is formed, preferably integral therewith, a pair of external gears C and E, spaced apart as shown in Fig. 1 and having any desired number of teeth.

A pair of external gears D and F is preferably formed integral and slidably mounted upon the enlarged portion 33 of the driven shaft 31. This pair of gears is prevented from independent relative rotation with respect to the driven shaft 31 by internal splines which cooperate with the external splines 34 provided on the enlarged portion 33 and are normally disposed between the external gear C and the external gear E on the countershaft 46. The gear D may have any desired number of teeth and is adapted to mesh with the external gear C, while the gear F, which also may have any desired number of teeth, is adapted to mesh with the external gear E. Any suitable means is provided for moving the gears D and F longitudinally along the enlarged portion 35 of the driven shaft 31 and when the gear D is moved forwardly into meshing engagement with the gear C the drive shaft 25 is connected with the driven shaft 31 which constitutes the second speed of the transmission gearing. Likewise, when the gear F is moved rearwardly into meshing engagement with the gear E the drive shaft 25 is connected with the driven shaft 31 which constitutes the first speed or low speed of the transmission gearing.

The reverse gearing consists of a pair of external gears G and H, having any desired number of teeth, and preferably connected or formed integral for simultaneous rotation, and is mounted upon a countershaft 48 which has its ends suitably supported in portions of the housing 20, as shown in Fig. 2. This pair of gears is normally disposed between the external gear C and the external gear E and is adapted to be moved longitudinally so as to bring the external gear G into meshing engagement with the external gear F, when the latter is in its normal position, and the external gear H into meshing engagement with the external gear E with the result that the drive shaft 25 is connected with the driven shaft 31 to thereby cause rotation of the latter in a reverse rotation.

Any of the usual means for shifting the movable members and gears may be employed but I have here shown the preferred arrangement.

The cover 24 slidably supports in portions thereof a plurality of shiftable rods 49, 50 and 51 which rods are disposed in the same horizontal plane and spaced apart as shown in Figs. 1 and 2. The shiftable rods are provided with depressions 52 in their upper surfaces which are adapted to cooperate with spring pressed detents 53 carried by the cover 24, as shown in Fig. 1. While only one of these detents is shown it is to be understood that there are as many detents as there are shiftable rods. These depressions 52 correspond to the neutral positions of the gearing and the relative speeds of the gear reduction mechanism, and the cooperation between the spring pressed detents 53 and the depressions 52 tend to prevent accidental disengagement of the gear mechanism when once adjusted to the desired driving speed. The tension of the spring of the spring pressed detents 53 may be adjusted by screw-threaded plugs 54 which also serve the purpose of retaining the springs in proper position.

The forward portion of the shiftable rod 49 is provided with a member 55 which is pinned or otherwise secured thereto and which has an integral depending shifting fork 56, the lower end of which fits within a circumferential groove formed by a pair of spaced flanges 57 which is integral with the slidable driving member 30. The member 55 is further provided with a pair of spaced ears 58 which is preferably formed integral therewith and which ears provide between them a recess 59 adapted to receive the lower end 60 of a shift lever 61.

The shiftable rod 50 has keyed or otherwise secured thereto a shifting fork 62 which cooperates with a circumferential groove 63 provided between the external gears D and F slidably supported upon the enlarged portion 33 of the driven shaft 31. The forward portion of the shiftable rod 50 is provided with a pair of upstanding ears 64 spaced apart longitudinally and providing therebetween a recess 65 which is likewise adapted to receive the lower end 60 of the shift lever 61.

The shiftable rod 51 has keyed or otherwise secured thereto a shifting fork 66 which cooperates with a circumferential groove 67 provided between the external gears G and H. The forward portion of the shiftable rod 51 has keyed or otherwise secured thereto a member 68 which is provided with a pair of ears 69 spaced apart to provide therebetween a recess 70 which is likewise adapted to receive the lower end 60 of the shift lever 61. Extending upwardly from the member 60 and adjacent the recess 70 is a projection 71, preferably formed integral, which cooperates with an extension 72 on a slidable member 73 mounted for slidable movement upon the shift lever 61, as shown in Fig. 3. The member 73 is normally urged towards its lowermost position or into a position in which the members 71 and 72 cooperate by a coil spring 74, which encircles the shift lever 61 and is maintained under proper tension by a fixed collar or washer 75. A rod 76 engages the lower portion of the member 73 and extends upwardly to a position adjacent the handle of the shift lever 61 (not herein shown) and is provided with any suitable means for causing longitudinal movement of the rod so as to disengage the members 71 and 72, otherwise when these members 71 and 72 are normally in engagement as shown in Fig. 3 the reverse gear is latched out of operative engagement.

From Figs. 1 and 3 it will be seen that the shift lever 61 is universally mounted at 77 in a tubular extension 78 which is an integral part of the cover 24. As a result it will be readily understood that by moving the shift lever 61 in accordance with the diagram in Fig. 4 the lower end 60 may be brought into cooperation with the respective recesses 59, 65 and 70 of the respective shiftable rods 49, 50 and 51 with the result that the gear reduction mechanism will be operated at various speeds depending upon which speed has been selected.

Returning now to the eccentric driving connection between the flanges 37 and 45 I have provided a construction which is an improvement over the construction disclosed in my copending application Ser. No. 363,774, filed May 17, 1929.

The circular flange 45 has its transverse face provided with a plurality of circular depressions 79. Six of these depressions 79 are illustrated as shown in Fig. 7 and are spaced approximately 60° apart, although it should be understood that any desired number may be employed, the purpose of a plurality being to provide sufficient strength for the transmission of power. A plurality of roller members 80 are disposed within these circular depressions 79 and are adapted to have rolling contact therewith. Portions of these roller members 80 extend through transverse openings 81 in a floater disk 82 and contact with the transverse forward end surface of the circular flange 37. These transverse openings 81 in the floater disk 82 are of approximately the same diameter as the diameter of the circular depressions 79, but are positioned eccentrically with respect thereto, as shown in Fig. 6.

The flange 37 has provided upon its transverse face a plurality of circular depressions 83 which, like the depressions 79 in the flange 45, are spaced 60° apart inasmuch as six of these depressions are herein illustrated in Fig. 5, although as before stated, any number may be employed. These circular depressions 83 in the flange 37 are, however, spaced midway or 30° offset with respect to the circular depressions 79 in the flange 45 and cooperating therewith are a plurality of roller members 84. As in the case of the roller member 80, these roller members 84 have portions which extend through transverse openings 85 in the floater member 82 and the forward ends of these roller members 47 contact with the transverse inner end surface of the flange 45. The openings 85 in the floater member 82 are positioned midway between the openings 81 and are eccentric with respect to the circular depressions 83 in the flange 37.

From the foregoing description it will, therefore, be readily understood that the roller members 80 provide an anti-friction driving connection between the flange 45 and the floater member 82, while the roller members 84 provide an anti-friction driving connection between the flange 37 and the floater member 82.

One of the important features of the construction and arrangement employed in connection with this coupling resides in the fact that a very slight degree of eccentricity is permissible while at the same time roller members of relatively large diameter may be used to thereby obtain the strength required without materially increasing the over-all dimensions. This is due to the fact that the diameter of the roller members is substantially as great as the diameter of the openings in which they roll.

Another feature is that there is no dead center upon which the rollers are likely to stop, and, consequently, there can be no binding. The diameter of the openings can be determined readily after the size of roller has been selected. The clearance between the lower edge of the roller and the lower surface of the opening when the top edge of the roller and the top surface of the opening are in contact is equal to one-half the eccentricity between the drive member and the driven member. Consequently, as the eccentricity is decreased, the clearance between the rollers and their associated openings is decreased and vice versa.

By using the floater disk 82 and making the thickness of the disk one-half the thickness of the rollers 80 and 84 and the depth of the circular depressions 79 and 83 one-half the thickness of the rollers, the rollers ride one-half in the circular depressions and one-half in the transverse openings 81 and 85 in the floater disk 82, contacting at the opposite ends with the transverse faces of the flanges 37 and 45. Further, by using the floater disk 82, the diameter of the transverse openings 81 and 85 may be made the diameter of the roller members 80 and 84 plus one-half of the amount of the offset or eccentricity between the axis of rotation of the drive member and the driven member resulting in much less rolling action than in the construction referred to in my copending application.

By having twice as many holes in the floater disk 82 as are in the flanges 37 and 45, the alternate openings in the floater disk 82 are what may be termed driving and driven openings. By placing the floater disk 82 midway between the flanges 37 and 45, the surface speed of these cooperating members is reduced substantially one-half, which is quite beneficial and important where plain surfaces such as these are used. In other words, the positioning of the floater disk 82 between the rotatable flanges 37 and 45 reduces the speed relation between the surfaces of the disk and the contacting surfaces of the disk and the contacting flanges to one-half as compared with the surface speed if the floater disk 82 were omitted and the flanges 37 and 45 adapted to rotate in contact. This driving connection, therefore, can be made much smaller and, as a result, will operate more quietly, due to the slower rolling action.

In Figs. 8, 9 and 10, there is shown one way in which to maintain the eccentrically rotatable flanges 37 and 45 of the driving coupling in proper relationship. This includes a cup-shaped member 86 provided with an opening in the bottom thereof of sufficient size to encircle the cylindrical hub portion 41. The rear surface engages the flange 45 while the forward end is provided with a laterally extending circumferential flange or extension 87. A similar cup-shaped member 88 is provided at the rearward end of the coupling and has its inner surface in contact with the flange 37, while the forward end is provided with a laterally extending circumferential flange 89 which is spaced longitudinally from the extension 87 to receive a split clamping ring 90. The ring and extensions are held together in suitable relationship by a wire 91 or other suitable retaining means which passes through suitably aligned openings in the members, as clearly shown in Fig. 8. This arrangement, of course, permits the coupling to be removed as a unit without danger of loss of the rollers 80 and 84.

In Fig. 11 there is illustrated a further use of the invention disclosed in the present application in which the coupling is interposed between eccentrically rotatable shafts without its application to a gearing mechanism. In this instance the drive shaft 92 is suitably journaled within a bushing 93 secured within a bearing 94. A driven shaft 95 is rotatably mounted about an axis eccentric to the axis of rotation of the drive shaft 92 within a bushing 96 supported in a bearing 97 which in the present instance is part of the same supporting device but may be made separately if desired. The drive shaft 92 at its forward end is provided with a laterally extending circular flange 98, while the driven shaft 95 is provided with a similar laterally extending circular flange 99, the diameters of the flanges being substantially equal but being offset relatively due to the eccentricity between the axis of rotation of the drive shaft 92 and the driven shaft 95. These flanges 98 and 99 are spaced a suitable distance apart, as shown in Fig. 11, so as to have disposed therebetween a floater member 100 of a type similar to the floater member 82 disclosed in Fig. 1. The inner face of the flange 98 is provided with depressions 101 of the nature and number corresponding to the openings 79 in the flange 45 in Fig. 1, while the flange 99 is provided with depressions 102 in the inner face thereof which correspond in number and arrangement, as illustrated in Fig. 1, to the openings 83 in the flange 37. The floater member 100 is provided with transverse openings 103 which correspond in number and position to the depressions 101 and 102 in both of the flanges 98 and 99. The depressions 101 in the flange 98 and the openings 103 in the floater member 100 have disposed therein roller members 104 which establish a driving connection between the flange 98 and the floater member 100 and which roller members have one of their ends engaging the base of the depressions 101 while the opposite end engages the inner surface of the flange 99. The roller members 105 are disposed within the depressions 102 and the openings 103 in the floater member 100 to establish a driving connection therebetween and one end of the roller members 105 engages the base of the depressions 102 while the opposite ends engage the inner surface of the flange 98. The coupling is held in suitable relationship by means of a sleeve or housing 106 which at its forward end is provided with an inwardly extending circular flange adapted to engage with a washer 107 which is held in contact with the flange 98. The opposite end of the sleeve 106 is provided with an inwardly extending flange which is severed as shown in Fig. 12 to provide tongues 108 which are bent inwardly into engagement with suitable slots 109 provided around the edge of a washer 110. The connection between the tongues 108 and the slots 109 is such as to permit insertion of the tongues into the slots and then to cause a relative rotary movement therebetween so as to move the tongues under the portions of the washer between the slots. This construction maintains the parts of the coupling in assembled relation and thus prevents accidental loss of the roller members.

Fig. 13 shows a further application of the invention to a two-speed gear reduction. A drive shaft 111 may be supported in any suitable manner for rotation about a fixed axis and at its inner end, as shown in Fig. 13, is rotatably supported by anti-friction roller members 112. The end of the drive shaft 111 is provided with an external gear M having any desired number of teeth and disposed upon one side of the roller members 112. On the opposite side of the roller members 112 and forwardly of the gear M is an external clutch N. A cylindrical member 113 is rotatably supported within a bushing 114 secured in a suitable transverse opening in a portion of a housing 115. The roller members 112, as shown in Fig. 13, contact with the inner surface of the cylindrical member 113 and in such a manner supports the drive shaft 111 for rotation about a fixed axis concentric with respect to the axis of rotation of the cylindrical member 113. At the rear portion of the cylindrical member 113 is an internal clutch O with which the external clutch N on the drive shaft 111 is adapted to cooperate for direct driving connection between the cylindrical member 113 and the drive shaft 111. At the forward end of the cylindrical member is a laterally extending circular flange 116 similar to the flange 45 shown in Fig. 1, which is provided upon its inner face with circular depressions 117. A driven shaft 118 is rotatably mounted within a bushing 119 fixed within a transverse opening in a portion of a housing 119ª for rotation about a fixed axis eccentric with respect to the axis of rotation of the drive shaft 111. The forward end of the drive shaft 118 is provided with a cylindrical extension 120 upon the inner surface of which is provided an internal gear P which is adapted to mesh with an external gear N on the drive shaft 112 to connect the drive shaft with the driven shaft for rotation at a reduced speed. The drive shaft 118 is further provided with a laterally extending circular flange 121 which is formed integral with the outer portion of the cylindrical extension 120. This flange 121 is spaced apart from the flange 116 and has disposed between the faces thereof a floater disk 122. The flange 121 is provided with circular depressions 123, while the floater disk 122 is provided with transverse openings 124.

The circular depressions 123 in the flange 121 aligns with alternate openings 124 in the floater disk 122 and driving connection between the members is established by means of roller members 125. The circular depressions 117 in the flange 116 cooperate with certain of the transverse openings 124 in the floater disk 122, and driving connection is established by means of roller members 126. The flanges 116 and 121, which make up this driving coupling, are enclosed in a suitable housing 127 in the manner previously described. This driving connection, as illustrated in Fig. 13, is similar to the driving connection shown in Fig. 1, and, consequently, a further detailed description is believed unnecessary.

In operation, the drive shaft 111 is adapted to be moved in one direction by any suitable means to bring the external clutch N into engagement with the internal clutch O and due to the 1 to 1 ratio coupling connection between the cylindrical sleeve 113 and driven shaft 118, the drive shaft and driven shaft are rotated at the same speed. If it is desired to impart rotation to the driven shaft 118 at a reduced speed with respect to the drive shaft 111, the latter is moved rearwardly so that the external gear M meshes with the internal gear P.

While I have described the preferred embodiments of the invention, it is to be understood that I am not to be limited thereto as changes and modifications may be resorted to without departing from the spirit of the invention as defined in the appended claims.

Having thus described my invention, what I claim is:

1. A coupling comprising a rotatable drive member, a driven member rotatable about an axis eccentric with respect to the axis of said drive member, a member rotatably disposed between said drive member and said driven member having transverse openings therethrough, and roller members disposed in said openings and engaging said drive member and said driven member, one of said roller members having a driving connection with said drive member and another of said roller members having a driving connection with said driven member.

2. A coupling comprising a rotatable drive member, a driven member rotatable in the same direction about an axis eccentric with respect to the axis of said drive member, a member rotatably disposed between said drive member and said driven member and having transverse openings therethrough, and roller members disposed in said openings and engaging said drive member and said driven member, one of said roller members having a driving connection with said drive member and another of said roller members having a driving connection with said driven member.

3. A coupling comprising a rotatable drive member, a driven member rotatable in the same direction about an axis eccentric with respect to the axis of said drive member, a member disposed between said drive member and said driven member and rotatable in the same direction and having transverse openings therethrough, and roller members disposed in said openings and engaging said drive member and said driven member, one of said roller members having a driving connection with said drive member and another of said roller members having a driving connection with said driven member.

4. A coupling comprising a rotatable driving member having depressions therein, a driven member rotatable in the same direction but about an eccentric axis with respect to said driving member and having depressions therein, a floating member disposed between said driving and driven members and having transverse openings therethrough, and roller members disposed in said openings, the ends of certain of said roller members extending into the depressions on said drive member and the ends of other of said roller members extending into the depressions on said driven member to establish a driving connection between said drive and driven members.

5. A coupling comprising a rotatable drive member having depressions therein, a driven member rotatable about an axis eccentric with respect to the axis of said drive member and having depressions therein, the depressions in said drive and driven members respectively being in staggered relation, a member rotatably disposed between said drive member and said driven member and having transverse openings therethrough, and roller members disposed in said openings, the ends of certain of said roller members extending into the depressions on said drive member and the ends of other of said roller members extending into the depressions on said driven member to establish a driving connection between said drive and driven members.

6. A coupling comprising a rotatable drive member having depressions therein, a driven member rotatable about an axis eccentric with respect to the axis of said drive member and having depressions therein, an intermediate member disposed between said drive and driven members and rotatable about an axis eccentric with respect to the axes of the latter and having transverse openings therethrough, and roller members disposed in said openings, the ends of certain of said roller members extending into the depressions on said drive member and the ends of other of said roller members extending into the depressions on said driven member to establish a driving connection between said drive and driven members.

7. A coupling comprising a rotatable drive member having depressions therein, a driven member rotatable about an axis eccentric with respect to the axis of said drive member and having depressions therein, an intermediate member disposed between said drive and driven members and rotatable about an axis eccentric with respect to the axes of the latter and having transverse openings therethrough, the depressions and adjacent openings being positioned in eccentric relation, and roller members disposed in said openings, the ends of certain of said roller members extending into the depressions on said drive member and the ends of other of said roller members extending into the depressions on said driven member to establish a driving connection between said drive and driven members.

In testimony whereof, I hereunto affix my signature.

JAMES P. JOHNSON.